Sept. 12, 1939.  A. GRIGAS  2,172,469
TRANSPARENT STOVE LID
Filed April 28, 1939
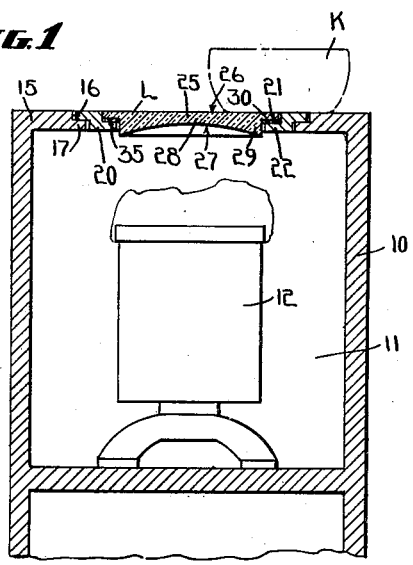
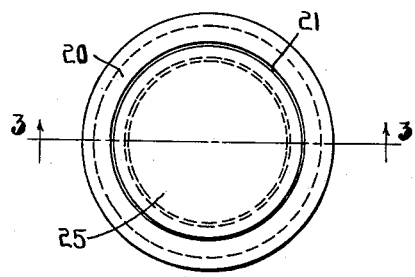
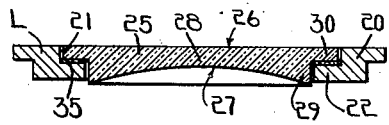
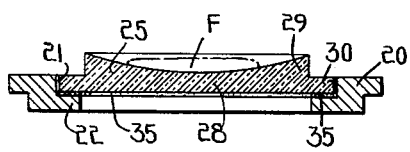
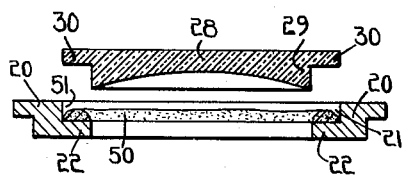
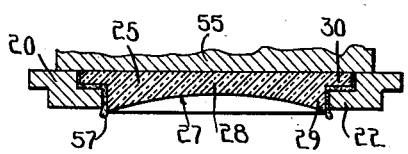
Inventor
Anthony Grigas
Walter H Wakefield
Attorney Patented Sept. 12, 1939

2,172,469

UNITED STATES PATENT OFFICE 2,172,469

TRANSPARENT STOVE LID

Anthony Grigas, Worcester, Mass.

Application April 28, 1939, Serial No. 270,593

4 Claims. (Cl. 126—220)

This invention relates to stoves and more particularly to improvements in stove lids.

With the introduction of oil burners for kitchen ranges and the like it became desirable to have a visual indication of the condition of the burner and with this thought in mind I have made a stove lid having a transparent plate through which the oil burning cylinder can be seen. I have made this plate of a heat resisting glass of a well-known type and have found that it withstands the temperature of the oil flame without breaking.

In the manufacture of the glass plate and the metal ring which supports it there is some slight irregularity with the result that in some instances the glass plate projects above the ring so that pots and kettles and the like do not set evenly on the lid. It is an object of my present invention to correct this irregularity by the use of a heat resisting cushion or packing on which the glass plate rests, the thickness of this cushion being regulated to compensate for the irregularity in the glass plate and its holding ring.

In my earlier experiments I placed the glass plate in direct contact with its metallic holder but found that breakages occurred occasionally, due probably to the different rates at which the glass and its metal holder conduct heat, and it is a further object of my present invention to separate the glass plate and its holder by a layer of material having a very low conductivity of heat, such as asbestos. I have found that the introduction of this low conductivity material between the glass plate and its metallic support reduced the breakage of the glass. The heat conductivity of the metallic ring is relatively high and the conductivity of the glass plate is considerably less, with the result that direct contact of the two parts having such different conductivities set up strains in the glass plate resulting in its breakage. By introducing a heat resisting layer of material having a very low conductivity for heat between the glass plate and its metal holder I am able to support the glass plate in proper position with respect to the holder while at the same time effectively preventing a transfer of heat from the metal holder to the glass plate. In this way the uneven temperatures of the glass plate and the holder due to the placing of a cold cooking utensil on the lid are prevented from setting up an uneven transfer of heat between the plate and its metal holder.

With these and other objects in view which will appear as the description proceeds, my invention resides in the combination and arrangement of parts hereinafter described and set forth.

In the accompanying drawing, wherein a convenient embodiment of my invention is set forth, Fig. 1 is a vertical section through a stove having my invention applied thereto, Fig. 2 is an enlarged plan view of the lid and glass plate, Fig. 3 is a vertical section on line 3—3 of Fig. 2,
with the plate in normal or upright position with its flat plane surface lying in the same general plane as that of the metallic holder, Fig. 4 is a view similar to Fig. 3 but with the glass plate inverted so that the concave face thereof may be used to hold a small amount of food which is either to be cooked or kept warm, and Figs. 5 and 6 are diagrammatic views showing the method by which the heat resisting material is placed between the glass plate and the metal ring when in the plastic form.

Referring to the drawing, I have illustrated my invention in connection with a stove employing an oil burning unit, although I do not wish to be limited in the practice of my invention to heating units of this type. The stove 10 has a fire box 11 in which is located any one of the several well-known commercial oil burning cylinders 12 supplied by means of a source not shown with kerosene.

The top of the stove 15 has an opening 16 with a flange 17 to receive the stove lid designated generally at L. In the present instance I illustrate my invention in connection with a lid having a metallic ring shaped body 20 provided with a circular recess 21 defined at the lower part thereof by a plate supporting flange 22. The glass plate 25 may be made of a heat resisting glass or other vitreous material through which a visual indication of the condition of the heating unit may be determined. This plate has a top flat surface 26 and a lower concave surface 27 so formed that the central part of the plate designated at 28 is comparatively thin while the outer periphery is thick as at 29. A supporting rim 30 of less thickness than the periphery 29 is formed at the peripheral edge of the plate and is designed for fitting into the opening in the ring 20.

In order to support the glass plate I provide on the upper surface of the flange 22 the body of heat resisting material designated at 35. This material may be made of asbestos for instance and is of such a thickness as to place the top surface of the glass plate in substantially the same plane as the top surface of the metallic supporting ring. I have found in practice that the body of asbestos may be used either as a ring cut from sheet material or can be applied in plastic condition and the glass plate pressed down until its top surface 26 is flat and in the same plane with the top surface of the metallic ring 20.

As previously stated, the heat conductivity of the metallic ring is relatively high while that of the glass plate is comparatively low. As a result, when any utensil such as the kettle K is placed on the lid there results an uneven absorption of heat. The asbestos between the glass and the metal, however, to a large extent checks the tendency for this uneven heat absorption to injure the glass plate because of the very low heat conductivity of the asbestos.

In Fig. 4 I have shown how the concave face of the glass plate may be used for cooking purposes. In this figure the plate is inverted from the position shown in Fig. 3 so that the hollow upper surface can contain food designated at F. The rim of the glass plate rests on the asbestos packing 35 and the latter effectively checks a transfer of heat from the metal ring to the plate when the latter is subjected to a temporary cooling at the beginning of the cooking operation.

In Figs. 5 and 6 I have shown the manner in which the heat resisting packing can be introduced between the glass plate and its metallic supporting ring when the heat insulator is of plastic form. In Fig. 5 I have indicated a mass of plastic asbestos 50 filling the notch 51 lying above the flange 22. The latter lies below the top surface of the ring 20 by a distance greater than the thickness of the glass rim 30. By means of a flat placing element 55 I then press the glass plate down until the pressing element rests on the metal ring 20 as indicated in Fig. 6. By this operation the excess plastic asbestos is extruded as indicated at 57 and that part of the asbestos which remains above flange 22 and below the rim 30 is of such a thickness as to maintain the top surfaces of the metal ring and glass plate in substantially the same plane.

From the foregoing it will be seen that I have provided a stove lid including a metallic ring and a glass plate which rests not directly on the metallic ring but on a body of heat insulating material, such as asbestos, which is supported by the metal ring. Because of this construction the asbestos not only serves as a shock absorber to afford a slight yielding support for the glass plate but also makes possible the construction of a stove lid in which the top surfaces of the glass plate and the metal ring lie substantially in the same plane. This last result can be accomplished either by varying the thickness of the sheet material of which the asbestos packing is cut, or by the method illustrated in Figs. 5 and 6. It will also be seen that the asbestos serves as an effective heat insulator between the metal ring and the glass plate and the latter is therefore relieved of heat strains to which it might otherwise be subjected if it had direct contact with the metal. Furthermore, the glass plate can be inverted as suggested in Fig. 4 and the asbestos packing will still serve to prevent too rapid a transfer of heat from the glass plate to the metal ring 20. The position shown in Fig. 4 can be assumed because of the fact that the glass plate is removable. The notch 51 is made deeper than the thickness of the rim 30 to provide room for the asbestos packing.

Having thus described my invention it will be seen that changes and modifications may be made therein by those skilled in the art without departing from the spirit and scope of the invention and I do not wish to be limited to the details herein disclosed, but what I claim is:

1. In a stove lid, a metallic ring having an aperture therethrough, a glass plate supported by the metallic ring, and a body of asbestos located between the metallic ring and the glass plate to prevent the latter from having direct contact with the metallic ring.

2. In a stove lid, a metallic ring having an aperture therethrough, a flange on the ring extending around the aperture, a body of asbestos supported on the flange, and a glass plate supported by the asbestos and being held by the latter out of contact with the flange.

3. In a stove lid, a metallic ring having an aperture therethrough, a flange on the ring extending around the periphery of the aperture, a body of asbestos supported by and projecting upwardly from the flange, a glass plate to be supported by the metallic ring, and a flange around the periphery of the glass plate resting on and being supported by the asbestos out of contact with the metallic ring.

4. In a stove lid, a metallic ring having an aperture therethrough, a flange formed on the ring and extending around the bottom of the aperture, a heat resisting transparent plate to cover the aperture, a rim on the plate to be located above the flange, said plate having a top flat surface and a bottom concave surface, and a body of heat insulating material on the flange and below the rim, said plate being reversible and the rim resting on the heat insulating material and limited as to lateral movement by the part of the aperture periphery above the flange whether the flat or concave surface of the plate be up.

ANTHONY GRIGAS.